United States Patent [19]

Schlossman et al.

[11] 3,839,245

[45] Oct. 1, 1974

[54] POLY(ETHER-ESTER-AMIDE) ANTISTATIC COMPOSITIONS DERIVED FROM DIMR ACIDS

[75] Inventors: Irwin S. Schlossman; Thomas Zoum Lin Li; Jack B. Boylan, all of Cincinnati, Ohio

[73] Assignee: Emery Industries, Inc., Cincinnati, Ohio

[22] Filed: Mar. 30, 1972

[21] Appl. No.: 239,729

[52] U.S. Cl............ 260/18 N, 117/138.8, 260/22 D, 260/78 S, 260/857 PG, 260/857 PE, 260/DIG. 17
[51] Int. Cl.................................. C08g 41/04
[58] Field of Search........ 260/857 PE, 857 PG, 857, 260/864, 18 N, 78 S, 22 D, DIG. 17, 857 UN; 117/138.8

[56] References Cited
UNITED STATES PATENTS

| | | | |
|---|---|---|---|
| 3,428,710 | 2/1969 | Daumiller et al. | 260/857 |
| 3,473,956 | 10/1969 | McIntyre et al. | 260/857 |
| 3,502,602 | 3/1970 | Helm et al. | 260/18 |
| 3,549,724 | 12/1970 | Okazaki et al. | 260/857 |
| 3,636,135 | 1/1972 | Garforth | 260/857 |
| 3,639,502 | 2/1972 | Okazaki et al. | 260/857 |
| 3,650,999 | 3/1972 | Martins et al. | 260/22 |
| 3,655,821 | 4/1972 | Lofquist et al. | 260/857 |
| 3,660,356 | 5/1972 | Radlmann et al. | 260/857 |

FOREIGN PATENTS OR APPLICATIONS

| | | | |
|---|---|---|---|
| 1,567,660 | 5/1969 | France | 260/857 |
| 793,451 | 4/1958 | Great Britain | 269/857 |

*Primary Examiner*—M. J. Welsh
*Assistant Examiner*—Eugene C. Rzucidlo
*Attorney, Agent, or Firm*—John D. Rice; Gerald A. Baracka

[57] ABSTRACT

Durable block copolymer antistatic compositions comprised of polyether and polyamide blocks arranged linearly and joined together with linking ester groups have been prepared. The poly(ether-ester-amides) have molecular weights below the fiber-forming range and contain a specified amount of the polyether block and a definite ratio of amide to ester linkages. They are blended with polyesters, polyamides and other fiber-forming polymers to impart durable antistatic properties.

21 Claims, No Drawings

POLY(ETHER-ESTER-AMIDE) ANTISTATIC COMPOSITIONS DERIVED FROM DIMR ACIDS

BACKGROUND OF THE INVENTION

Antistatic agents are widely used as processing aids for spinning and weaving polyester, polyamide and polyolefin fibers. Any number of hydrophilic agents, primarily polyoxyethylene glycol and polyoxyethylene derivatives of fatty acids, fatty alcohols, cyclic alcohols, hydroxylamine, alkyl amines and alkyl amides have been suggested as antistatic finishes for this purpose. These agents prevent the accumulation of electrical charge when the fiber is passed through guides or over surfaces at a high rate of speed in processing equipment. The materials are coated on the surface of the fiber during processing to increase the surface conductance and thus prevent static charge buildup. While such antistatic agents satisfy the requirements for textile finishing they do not provide permanent antistatic protection necessary for certain end-use applications such as in wearing apparel, upholstering covering, carpeting and the like, since they are easily removed by repeated usage, wiping, rubbing, laundering and drycleaning.

To increase the permanence of antistatic agents it has been proposed that the antistatic moiety be chemically bonded to the fiber-forming composition. This can be achieved by using cross-linking agents such as polyamines containing polyether segments. U.S. Pat. No. 3,473,956 teaches the modification of polyamides by the use of polyoxyalkylene groups, said groups being chemically bound to the polyamide in the chain (block polymer), as a terminal group, or as a side chain (graft copolymer). British Patent No. 948,507 copolymerizes polyoxyethylene glycol into the polyamide backbone by replacing a portion of the low molecular weight diamine which is condensed with the dicarboxylic acid with a diamine derived from polyoxyethylene glycol. In this manner a polyether-polyamide copolymer or interpolyamide capable of being formed into filaments having a greatly reduced tendency to accumulate electrostatic charge is obtained. While fibers obtained by such methods have improved long-term antistatic properties as compared to fibers which simply have a surface coating of the antistatic agent, there are disadvantages associated with such procedures. In most instances the chemical modification adversely affects the physical properties of the so-modified polyamide and oftentimes this is accompanied by an increase in the susceptibility for deterioration upon exposure to heat and/or light.

The disadvantages realized from having the antistatic moiety (e.g., polyether) bound into the polymer structure have made it evident a better method for obtaining durable antistatic compositions is needed. Some theorize that if permanent antistatic protection is to be obtained the antistatic moiety must be free to migrate within the fiber so that the antistatic agent can constantly be regenerating itself on the surface of the fiber where it is required for efficient dissipation of electrostatic charges. Still others feel that the poly(alkylene ether) must be present as a separate phase so that the elongated particles of poly(alkylene ether) can function as the electrical conductor within the fiber. Regardless of the reason and without a complete understanding of the mechanisms involved the industry has nevertheless come to the realization that the ideal antistat is not one which is "tied-up" via chemical bonding to the fiber but rather one which is present as an additive.

In view of the apparent desirability of this latter approach many antistatic compositions have been suggested for blending with polymers such as polyamides and polyesters. For example, U.S. Pat. No. 3,329,557 teaches the use of about 2 percent or more by weight of a poly(alkylene ether) uniformly dispersed in a melt-spinnable synthetic polymer prior to the melt-spinning (see also U.S. Pat. No. 3,475,898). Polyalkoxylated triglycerides of fatty acids have also been suggested for polyamides to improve the antistatic properties of the resulting filaments in U.S. Pat. No. 3,388,104. Serious problems are often encountered with such compositions, however, due to excessive volatility, lack of heat stability, ready solubility in water and other solvents and incompatibility with the polyamide. Volatility and heat stability are important processing considerations and incompatibility can result in phase separation during the meltspinning, thus causing processing difficulties, or after fabrication these antistatic agents tend to exude to the surface within a short time leaving an oily or sticky film which gives an undesirable appearance and feel to the fabric, increases the soiling tendency and leaves the fiber with essentially no permanent antistatic protection.

U.S. Pat. Nos. 3,549,724 and 3,594,266 describe block copolymer compositions and their use in polyamide filaments. The U.S. Pat. No. 3,549,724 patent employs blends of polyamides with polyether-polyamide block copolymers, said block copolymers prepared by the polycondensation reaction of polyamide producing monomers, such as diamines and dicarboxylic acids, with polyethers terminated with amino groups or salts thereof and/or carboxyl groups or organic amine salts thereof. An essential feature of this invention is that the polyether be terminated so that it contains essentially no free hydroxyl groups capable of reacting with the polyamide producing monomers, such as the dicarboxylic acid, through an ester linkage. The polyether is terminated in such a way that it can only be reacted with the polyamide-producing monomers through amide linkages. The fiber-forming polyamide and the polyamide component of the block copolymer are preferably formed from the same monomers.

SUMMARY OF THE INVENTION

We have now quite unexpectedly discovered improved durable antistatic agents capable of being blended with both polyamides and polyesters as well as other polymeric compositions. The antistatic compositions of this invention are block copolymers comprised of polyether and polyamide blocks linearly joined together with ester linkages. The block copolymers, which may also be referred to as poly(ether-ester-amides), are relatively low molecular weight polymeric materials, that is, below the fiber-forming molecular weight range. They are readily blended and compatible with polyamides and polyesters. Being polymeric materials their molecular weight is such that they have extremely low volatility. They also possess excellent heat stability. Most importantly, however, they are readily compatible with polyamides and polyesters during the processing operations and once blended into the fibers or other molded and shaped articles they impart permanent antistatic properties, i.e., they are not removed after repeated washings and launderings.

The block copolymers are comprised of discreet polyether and polyamide block segments arranged linearly and bonded together with linking ester groups. The copolymer compositions of this invention have molecular weights below the fiber-forming range and have definite requirements with regard to the ester and amide groups present therein as well as the amount of bound polyether. The polyether blocks comprise from about 10 to about 75 percent by weight of the block copolymer with the individual polyether segments having molecular weights ranging from about 300 to 10,000. Preferably the polyether blocks are derived from polyoxyethylene glycols having molecular weights from about 1000 to 5000 and comprise about 20 to about 60 percent by weight of the block copolymer composition. The theoretical amide:ester linkage ratio within the block copolymers ranges from about 0.5 – 25:1 and more preferably 2 – 10:1. A preferred embodiment of this invention encompasses block copolymer antistatic compositions wherein the polyamide blocks are derived from polymeric polybasic acids, preferably dimer acids. The use of polymeric acid introduces a hydrocarbon segment, branched or straight chain, into the polyamide blocks. Employing this latter technique it is possible to obtain antistatic compositions having excellent permanence and compatibility with the fibers.

DETAILED DESCRIPTION

The improved antistatic compositions of the present invention are polymeric materials of moderate molecular weight, but below the fiber-forming molecular weight range, comprised of polyether and polyamide blocks linearly bonded with ester linkages. The poly(ether-ester-amides) are readily blended and compatible with polyesters, polyamides and other polymeric materials and when incorporated into fibers and shaped articles they impart permanent resistance to static charge buildup. The superior durability of these antistatic compositions is attributable at least in part to the face that the block copolymers are not removed after numerous washings. Antistatic agents of this invention have extremely low volatility and excellent heat stability. Additionally, these block copolymers have low solubility in water and they do not adversely affect the color of the finished articles. In addition to their ability to withstand numerous launderings by virtue of their low solubility they are also resistant to the severe treatment encountered during dyeing operations.

The polyamide portion of the block copolymer compositions is prepared by reacting polyamines and polybasic acids using conventional reaction techniques. Preferably the predominant polyamide blocks are the condensation products of diamines and dibasic acids and have the general formula

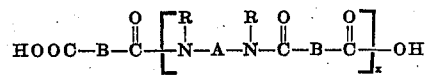

wherein R is hydrogen or an alkyl radical containing from 1 to 18 carbon atoms, B is a radical derived from dimer acid and containing from 30 to 50 carbon atoms, A is a radical(s) derived from a diamine and x is an integer from 1 to about 20. It is evident from the above formula that the polyamide may range from the simple reaction product obtained by the reaction of 1 mol diamine and 2 mols dibasic acid ($x$ is equal to one) or it may consist of high molecular weight polymeric compositions which have molecular weights up to about 10,000 or higher. The molecular weight of the acid-terminated polyamide blocks which will subsequently be reacted with the polyoxyalkylene glycol is preferably between about 1000 and 6000.

The radical A is the group bridging the two amine nitrogen atoms and may be an alkylene radical such as ethylene, hexamethylene or the like; a cycloalkylene radical such as cyclohexylene; an arylene radical such as phenylene; and

where R is a bivalent radical, preferably alkylene, and the nitrogen atoms will be located at the * positions to close the ring. These radicals result when alkyl diamines containing from 2 to 54 carbon atoms; alicyclic diamines wherein the ring system contains 4 to 8 carbon atoms and which additionally may be substituted with one or more alkyl groups containing 1 to 8 carbon atoms; aryl diamines wherein the aromatic nucleus may contain additional substituents such as alkyl and alkoxyl groups containing from about 1 to 8 carbon atoms; and heterocyclic diamines wherein 1 or both of the amine nitrogen atoms are part of a ring structure are condensed with the dibasic acid to form the polyamide block segment. Useful diamines of the above types include ethylenediamine, propylenediamine, tetramethylenediamine, pentamethylenediamine, hexamethylenediamine, hexamethylenediamine, decamethylenediamine, hexadecamethylenediamine, 3,4,5-trimethylhexamethylenediamine, dimer diamine (diamines of dimeric acids obtained by the polymerization of oleic acid or similar unsaturated acids), p-xylylenediamine, p-phenylenediamine, 1-methyl-2,4-diaminobenzene, N,N'-dimethylphenylenediamine, 1,4-diaminocyclohexane, bis-(p-aminocyclohexyl)methane, N,N'-dimethyl-1,4-diaminocyclohexane, bis-(p-aminocyclohexyl)methane, N,N-dimethyl-1,4-diaminocyclohexane, piperazine, 2,5-dimethylpiperazine, isophoronediamine, N-oleyl-1,3-diaminopropane, N-coco-1,3-propylenediamine, methylimino-bis-propylamine, and the like.

Reacted with the diamine to form the polyamide blocks are polybasic acids containing from 6 to about 56 carbon atoms or their polyamide forming derivatives. The use of acids is preferred since this minimizes undesirable coproducts which could subsequently interfere with the formation of the block copolymer and/or its effectiveness as an antistatic agent. In general, any difunctional branched or straight-chain aliphatic, aromatic or alicyclic dicarboxylic acid, and mixtures thereof, may be used. While acids containing three or more carboxyl groups may be used dicarboxylic acids are preferred. Useful dicarboxylic acids contain from about 6 to about 56 carbon atoms. These include adipic acid, suberic acid, azelaic acid, sebacic acid, undecanedioic acid, dodecanedioic acid, brassylic acid, thapsic acid, dimer acids obtained by the polymerization or unsaturated fatty acids, terephthalic acid, isophthalic acid, phthalic acid, bibenzoic acid, cyclohexanedicarboxylic acid, and the like. Aromatic diacids may be substituted with one or more other substituent such as halogen, including chlorine and bromine, and alkyl or alkoxyl groups containing from 1 to about 8 carbon atoms.

In one of the preferred embodiments the acid-terminated polyamide blocks are obtained by the reaction of a diamine with an excess of dibasic aid having a molecular weight approximately 3 or more times greater than the molecular weight of the diamine. The diamines preferably are piperazine and aliphatic diamines containing from about 2 to 10 carbon atoms and the dibasic acids are dimer acids containing from about 32 to 52 carbon atoms. The useful dimer or polymer acids are obtained by the polymerization of monocarboxylic acids containing ethyleneic unsaturation. Polymerization process for the preparation of the polymer acids are known to the art. The monocarboxylic unsaturated acids polymerized generally contain about 16 to 26 carbon atoms and include, for example, oleic acid, linoleic acid, eleostearic acid and other singly or doubly unsaturated acids. To obtain dimer acids 2 mols of the unsaturated monocarboxylic acid are reacted, that is dimerized. If the resulting dimer or polymer acid contains ethyleneic unsaturation it may be hydrogenated prior to use. Mixtures of dimer acids may be reacted with the diamine to obtain the polyamide block. Trimer and tetramer acids obtained by such processes may also be present with the dimer acid as long as at least about 75 percent of the overall acid composition is dimer acid. Commercially available compositions, sold under the trademark "Empol," which are mixtures of polymerized fatty acids having dimer acids as the major constituent may be advantageously employed. An especially useful dimer acid is the $C_{36}$ dibasic acid obtained by the dimerization of unsaturated $C_{18}$ fatty acids.

The method used for the preparation of the polyamide block is not critical and may be widely varied. Conventional reaction techniques known to the art for condensing diamines and dibasic acids to form amides can be employed. The reaction generally consists of combining the diamine and dibasic acid and heating at an elevated temperature with or without a catalyst while continually removing water of reaction. The reactions are conveniently followed by measuring the water of reaction taken off or by measuring the acid value and/or amine value of the reaction mixture. The particular diamine and dibasic acid used and the amount of each determines the composition of the polyamide block. This is governed by the composition desired for the final block copolymer composition as well as its ultimate end use.

The polyamide block may be prepared independently, prior to contacting with the polyether, or the diamine and dibasic acid may be added to the reaction mixture which already contains the polyether and the polyamide block formed in situ. In the former case where the polyamide block is formed prior to any contact with the polyether block, the appropriate amount of dibasic acid will be heated between about 150° and 220°C, depending on the particular process employed, and the diamine added. The heating is continued and the reaction temperature raised to about 240°C, but generally not exceeding 250°C. A vacuum may be pulled on the system to facilitate removal of the water of reaction. The reaction is continued until the reaction mixture has no appreciable amine value. The resulting polyamide may be utilized directly, by the addition of a polyether moiety thereto, or it may be stored for subsequent esterification with the polyoxyalkylene glycol employing standard procedures.

In the alternative procedure where the diamine and dibasic acid are reacted in the presence of a polyether, the reaction conditions are controlled to maximize the amide-forming reaction, i.e., favor formation of the polyamide block, and minimize ester formation by the reaction of polyoxyalkylene glycol and free dibasic acid present in the reaction mixture. This is accomplished by employing moderate reaction conditions in the early stages of the reaction. Since the amide formation occurs more readily (at lower reaction temperatures) than ester formation, the first stage of reaction is conducted at temperatures up to about 150° to 170°C until no appreciable amine value. It is not generally necessary to pull a vacuum on the reaction mixture during the amide-forming step. Once the desired amine value and acid value are reached indicating formation of the polyamide block polymer more rigorous reaction conditions (higher temperature and reduced pressure) are applied to esterify the polyoxyalkylene glycol.

Employing either reaction technique the polyether block employed is pre-formed. The polyether segments are derived from polyoxyalkylene glycols having molecular weights between about 300 and 10,000 obtained by the condensation of the appropriate number of alkylene glycol units. Preferably the polyoxyalkylene glycols have molecular weights from about 1000 to about 5000. Polyoxyalkylene glycol compounds useful for the present invention correspond to the formula

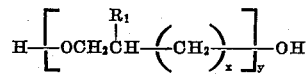

wherein $R_1$ is hydrogen or an alkyl group of 1 to 4 carbon atoms, $x$ is an integer from 0 to about 8 and $y$ is a large whole number and represents the number of recurring ether units. The terminal hydroxyl groups present thereon are capable of reacting with the carboxyl groups of the dibasic acid and acid-terminated polyamide to form ester linkages. The theoretical number of ester linkages in the block copolymer antistat composition is governed by the number of equivalents of polyoxyalkylene glycol compound available for reaction with unreacted carboxyl groups of the dibasic acid. The molar proportions of the dibasic acid, diamine and polyoxyalkylene glycol charged should be such that the theoretical amide:ester linkage ratio within the block copolymer ranges between about 0.5:1 to 25:1, and more preferably, from about 2:1 to 10:1.

Useful polyoxyalkylene glycol compounds for this invention include polyoxyethylene glycol, polyoxypropylene glycol, polyoxybutylene glycol, polyoxyethylenepropylene glycol, polyoxytetramethylene glycol, polyoxydecamethylene glycol and the like. Polyoxyethylene glycols are readily available from commercial suppliers under the trade designations of "Carbowax" and "Polyox" or they may be synthesized employing known reaction methods. For this invention it is not desirable that the polyoxyalkylene glycols be capped or terminated with moieties heretofore reported as being useful for this purpose since this would destroy the ability to react with the dibasic acid and carboxy-terminated polyamide through ester linkages which is essential for the purposes of this invention.

The present antistatic compositions are comprised of block polymer segments linearly bonded through ester linkages and are obtained by reacting the appropriate reactants in the manner prescribed above. The polyether block may comprise from about 10 to 75 percent by weight, but preferably from about 20 to 60 percent by weight of the total compolymer composition. The dibasic acid is used as the reference reactant and for each equivalent of the dibasic acid 0.04 to 0.96 equivalents, preferably, 0.5 to 0.85 equivalents of the diamine are employed. The amount of polyoxyalkylene glycol charged is determined from the equation:

(equivalents dibasic acid) − (equivalents diamine) = equivalents polyoxyalkylene glycol The equivalents of polyoxyalkylene glycol will therefore range between about 0.96 and 0.04, more preferably from 0.15 to 0.5, per equivalent dibasic acid. While it is preferred that the reactants be charged in accordance with the above equation to obtain a balanced reaction system, it is not essential that the number of equivalents dibasic acid always be equal to the combined equivalents of diamine and polyoxyalkylene glycol. While stoichiometric relationships are preferred about 20 percent variation in the equivalents is possible without destroying the utility of the block copolymers. For example, for one equivalent dibasic acid the combined charge of the diamine and polyoxyalkylene glycol can range from about 0.8 to 1.2 equivalents or, conversely, 0.8 to 1.2 equivalents dibasic acid can be employed when the combined diamine and polyoxyalkylene glycol equivalent is one. It is also possible that all of a given reactant may not be reacted, e.g., polyoxyalkylene glycol, so that even though the system is balanced as it it charged it may not be balanced as it is reacted. It is evident that in no instance will all the functional groups be reacted since there must always be some terminal groups, however, efforts should be made to insure that all the components are at least partially reacted and incorporated into the block copolymer. While both functional groups on a diamine, dicarboxylic acid or glycol molecule may not be reacted, at least one of the functional groups should have entered into the reaction. Considerable variation of the reactants is possible with the present block copolymers as long as the conditions previously set out with respect to the amide:ester linkage ratio and the weight percent polyether in the final composition are satisfied.

The following examples illustrate the invention more fully, however, they are not intended as a limitation on the scope thereof. In these examples all parts and percentages are given on a weight basis unless otherwise indicated.

EXAMPLE I

A reaction flask fitted with a stirrer, condenser, thermometer and Dean-Stark trap was charged with 273 grams $C_{36}$ dibasic acid (Empol 1010 Dimer Acid) and the reactor and its contents heated to 160°C at atmospheric pressure. Twenty-six grams of a 92 percent aqueous solution of ethylenediamine was added dropwise at a rate so that the temperature in the head never exceeded about 100°C. The reaction was continued for two hours and during the last hour a vacuum of 27.5 inches Hg pulled on the system. The reaction mixture at this point had an acid value of 29 and essentially no amine value. 320 Grams polyoxyethylene glycol (Carbowax 4000) having an average molecular weight of 4000 was added to the reaction mixture at a rate so that the pot temperature was maintained at about 240°–250°C. This addition was complete after about one hour and the reaction continued at 250°C for an additional 4½ hours under vacuum during which time 15.2 grams water was collected.

The resulting poly(ether-ester-amide) product had a viscosity of 15 poise at 180°C measured with a Brookfield LVF Viscometer (spindle No. 4 at 60 rpm), and an acid value of 9.15 and a negligible amine value. The block copolymer composition had a theoretical amide:ester linkage ratio of about 1.0:0.2.

To test the effectiveness of the block copolymer compositions as antistatic agents several testing techniques are employed. As an initial screening procedure a yarn or fabric is immersed into a solution of emulsion containing the block copolymer antistatic agent and after drying subjected to a voltage decay test. While this is a quick, convenient and fairly objective test method it simply shows the degree of surface conductivity provided by the antistatic agent and does not give an indication of the durability of the antistatic composition. Another simple and convenient test is performed with films which have the antistatic agents blended therein. The films are charged by rubbing and the amount of dust attracted as the film is brought in proximity to cigar or cigarette ash is observed. Measurement of the durability (permanence) of the antistatic compositions is obtained by subjecting the yarns having the antistatic agent incorporated therein, which may be made into fabrics, to repeated launderings and measuring the antistatic resistance of the yarns or fabrics at various intervals. Any change in the antistatic properties can be followed using the voltage decay test or one of the other tests which have been developed for this purpose such as the electrostatic cling test (AATCC Test Method 115-1969).

The preliminary voltage decay test is conducted by dissolving the block copolymer antistat in butanol (4 grams/100 grams butanol) and then immersing a known weight of nylon fabric (No. 354A spun nylon, type 200, Testfabrics Inc.) into the solution. The fabric is removed and excess liquid removed by gently squeezing. This procedure is repeated until the fabric absorbs a weight of solution about two times its original dry weight. The fabrics are then laid flat over a polyethylene sheet and allowed to air-dry for a minimum of 24 hours in a constant humidity room (40 percent relative humidity). One-inch pieces of the so-treated fabrics are then stretched between the two contacts of a standard static voltmeter and a charge applied to the yarn. The time (in seconds) required for the voltage to dissipate to 50% of the initial value is recorded and this time × $10^{11}$ ohms represents the resistance of the fabric. Resistance values less than $20 \times 10^{13}$ are considered acceptable and a value less than about $5 \times 10^{13}$ is superior. A nylon 6 fabric tested in accordance with the above procedure and coated with the above-prepared block copolymer composition had a resistance of $3.5 \times 10^{13}$.

A nylon 6 film containing about 4 percent by weight of the block copolymer was rubbed with a wool cloth a given number of strokes in one direction and stretched over an ashtray containing cigar ash (about one inch above the ash) to determine the extent of ash pickup. Films containing the block copolymer antistatic agent showed negligible ash pickup as compared to identical nylon films which contained no antistatic agent.

EXAMPLE II

Following the procedure described in Example I the reaction was repeated using a polyoxyethylene glycol having an average molecular weight of about 1000. The reactant ratios of dimer acid and diamine employed were identical to that of Example I. The resultant block copolymer composition contained 23 percent by weight polyether and had a theoretical amide:ester linkage ratio of 1.0:0.2. Nylon 6 yarn containing the so-prepared block copolymer at a 4% weight level had a resistance of $1 \times 10^{13}$.

EXAMPLE III

In accordance with the proecdure of Example I, block copolymers were prepared from $C_{36}$ dibasic acid (Empol 1010 Dimer Acid) and hexamethylenediamine with two different poly(ethylene ether) glycols. In the first reaction the poly(ethylene ether) glycol had an average molecular weight of 1000 whereas in the second reaction the average molecular weight of the poly(ethylene ether) glycol was 4000. In both reactions the equivalents ratio of the dimer acid:diamine: poly(ethylene ether) glycol was 1.2:1.0:0.2. The block copolymer compositions obtained were evaluated in the voltage decay test with nylon 6 yarns and had resistance values of $0.65 \times 10^{13}$ and $6.0 \times 10^{13}$, respectively.

EXAMPLE IV

Various aliphatic, alicyclic, aromatic and heterocyclic diamines were reacted with Empol 1010 Dimer Acid and a poly(ethylene ether) glycol having an average molecular weight of about 4000 in accordance with the procedure of Example I. The equivalents ratio of the reactants was 1.2:1.0:0.2 (dimer acid: diamine:- poly(ethylene ether) glycol. The table below lists the diamines, the weight percent polyether in the block copolymer and the resistance value obtained when the resulting block copolymer compositions were employed as antistatic agents for nylon.

| DIAMINE | POLY(ETHYLENE ETHER) GLYCOL (WT %) | RESISTANCE ($10^{13}$) |
| --- | --- | --- |
| xylylenediamine | 51 | 2.6 |
| 1,3-propanediamine | 53 | 2.4 |
| 1,2-propanediamine | 53 | 3.8 |
| 3,4,5-trimethylhexa-methylenediamine | 50 | 2.1 |
| piperazine | 52 | 12 |
| 1,4-cyclohexane-bis-methylamine | 51 | 6.1 |
| isophoronediamine | 48 | 2.6 |
| N-oleyl-1,3-diaminopropane | 44 | 1.5 |
| N-coco-1,3-propylenediamine | 46 | 2.3 |
| methylimino-bis-propylamine | 49 | 3.2 |

The block copolymer prepared with 1,3-propanediamine was evaluated as a finish on nylon 6,6 and polyethylene terephthalate fibers and gave excellent protection against electrostatic charge buildup. When this same block copolymer was incorporated into nylon 6 at a 4 weight percent level the initial resistance of the yarn was $0.5 \times 10^{13}$. Subjecting the yarn to a mock dye bath did not destroy the antistatic properties. After 10 actual machine washings and 25 simulated washings (50°C for 2 hours) the resistance values obtained for these yarns were $1.2 \times 10^{13}$ and $10.2 \times 10^{13}$, respectively. The small increase in resistance indicates that the antistatic agent has a high degree of permanence and is acceptable in applications where durable antistatic agents are required.

EXAMPLE V

To demonstrate the preparation of the present block copolymer antistatic compositions when the reactants are added as a unit charge the following run was conducted:

62.3 Pounds polyoxyethylene glycol (average molecular weght 4000), 53 lbs $C_{36}$ dimer acid and 4.7 lbs ethylenediamine were charged to a 20 gallon reactor. The reactor was purged with nitrogen and a 10 psig nitrogen blanket maintained. The reaction mixture was heated to 150°C and held at this temperature until an acid value of 17 was achieved. The amine value at this point was about 2. The temperature of the reaction mixture was then increased to 245°C and vacuum of 20 inches applied to the reactor. The heating was terminated when the acid value of the reaction mixture reached 7 and the amine value was less than 1. The resulting poly(ether-ester-amide) had excellent antistatic properties when used as a surface finish for both nylon and polyester fibers and when blended with these fibers at 4 percent weight level.

EXAMPLE VI

To demonstrate the ability of the block copolymers to function as permanent antistatic agents a block copolymer derived from hexamethylenediamine, $C_{36}$ dimer acid and polyoxyethylene glycol (molecular weight 4000) as described and prepared in Example III was blended into nylon 6 fiber. The fiber contained 4 percent by weight of the antistatic additive. Yarns prepared from these fibers had a resistance of $4.3 \times 10^{13}$. After 10 machine washings in a Frigidaire Model WS2 automatic washer using the prescribed wash setting and amount of detergent (Tide) the resistance value was $0.7 \times 10^{13}$, actually an improvement in the antistatic properties which is unexplained. Subjecting the yarns to even more vigorous conditions (agitating in a detergent solution for 2 hours at 50°C) did not significantly decrease the antistatic properties and the resistance was still $7.5 \times 10^{13}$.

The block copolymers of this invention are useful as additives for numerous polymer compositions to impart improved antistatic properties to the resulting polymer blends. Particular advantage is obtained with the present compositions when they are blended with fiber-forming polyesters and polyamides. This is attributable, at least in part, to the similarity of the block copolymer structures which contain amide and ester groups with the structures of the fiber-forming polyamides and polyesters.

Polyamides in which the block copolymers of this invention are useful are the synthetic linear polyamides prepared by the polymerization of monoaminocarboxylic acids and amide-forming derivatives thereof or suitable diamines and dicarboxylic acids and their amide-forming derivatives. These polyamides are known to the art and may be obtained by any conventional polymerization process for reacting the monomers. The block copolymer compositions are also useful with melt-spinnable polyamide copolymers. Especially useful polyamides are poly(hexamethylene adipamide) obtained by the condensation polymerization of hexamethylene diamine and adipic acid, referred to as nylon 6,6, and poly (caproamide) or nylon 6 obtained by the condensation reaction of caprolactam. These polyamides are of special interest since they are widely used throughout the fiber industry for melt-spinning and in related operations. Other polyamide compositions, may, however, also be advantageously blended with the block copolymer antistats of the present invention and these include: poly(tetramethylene adipamide), poly(pentamethylene adipamide), poly(heptamethylene adipamide), poly(heptamethylenepimelamide), poly(octamethylene adipamide), poly(decamethylene adipamide), poly(hexamethylene sebacamide), poly(pyrrolidone), poly(octamethylene oxalamide), poly(hexamethylene isophthalamide), poly(2-methyl-hexamethyleneteraphthalamide), and the like. Also useful are polyamides prepared from piperazine and aliphatic dibasic acids and those derived from 11-aminoundecanoic acid and the polyurea-type polyamides derived from carbonic acid.

Polyesters with which the poly(ether-ester-amides) of this invention are useful are condensation polymers obtained by the reaction of one or more diols with dibasic acids or suitable derivatives thereof. The glycols generally have the formula $HO+CH_2+_n OH$ wherein n is an integer from about 2-10, such as ethylene glycol, 1,3-propanediol, 1,3,-pentanediol, 1,6-hexanediol, 1,7-heptanediol, 1,8-octanediol, 1,9-nonanediol, 1,10-decane diol and the like. Useful dicarboxylic acids include terephthalic acid, isophthalic acid, adipic acid, sebacic acid, succinic acid, oxalic acid, glutaric acid, pimelic acid, suberic acid, azelaic acid and the like. In addition to the more common diols and dicarboxylic acids other reactants which may be utilized to make polyesters include glycerol, sorbitol, pentaerythritol, methoxypolyethylene glycol, neopentyl glycol monohydroxypivalate, trimethylolpropane, trimesic acid, p,p'-dicarboxydiphenylmethane, p,p'dicarboxydiphenoxyethane, p-carboxyphenoxyacetic acid and the like. Especially useful polyesters for the purpose of this invention are poly(ethylene terephthalate) and poly(1,4-cyclohexylenedimethylene terephthalate) because of their commercial availability and superior fiber-forming characteristics. The block copolymer antistats of this invention may also find utility with polyolefins, polyurethanes, polyureas, polysulfonamides and the like, or polyester and polyamide blends with one or more of these polymers or blends with wool or cotton fibers or yarns.

The amount of the poly(ether-ester-amide) incorporated in the fiber-forming polyamide or polyester to impart improved antistatic properties will range between about 0.1 and 20 percent by weight of the total polymer composition. It is preferred, however, that about 1 to about 7 percent by weight of the block copolymer be used with polyesters and polyamides to obtain optimum results. When employed in these amounts and when the block copolymer meets the previously described conditions with respect to amide:ester linkage ratio and weight percent polyether, excellent compatibility between the polyester or polyamide fibers and the anitstatic composition of this invention is obtained as well as significantly improved resistivity to static charge buildup, both initially and after repeated launderings.

In general, any manner of incorporating the present antistatic compositions into the fiber-forming polymer will result in improved resistivity to static electrical charge buildup. Preferably, however, the block copolymer antistats are mechanically mixed directly with the preformed fiber-forming polyamide or polyester prior to the melt-spinning or shaping operations. The block copolymers are readily incorporated into the fiber-forming polymers using conventional mixing equipment, such as a Banbury mixer, revolving drum or sigma blade mixer, and require no special processing or handling. They may be mixed with the polymer in dry form or can be dissolved or dispersed in a suitable solvent for addition to the fiber-forming polymer. The antistatic composition and fiber-forming polymers may be melted and mixed in the molten state if desired. Solutions of the block copolymers can also be sprayed onto the polymer which has been formed into pellets, rods, or is in the powder form, prior or during the melt-spinning and upon removal of the solvent at elevated temperature and/or under reduced pressure the antistatic block copolymer residue will remain on the surface to impart protection against electrostatic charge buildup. Best results are obtained when the antistatic compositions are blended into the fiber-forming polymer. Excessive mixing should generally be avoided since it is not necessary and may be detrimental since it is possible to reduce the molecular weight of the fiber-forming polymer and/or block copolymer by mechanical shear and thus detract from the overall physical properties of the resulting compositions.

The block copolymer antistatic agent may be added to the fiber-forming polymer by itself or in combination with other known compounding ingredients such as stabilizers, lubricants, plasticizers, delusterants, dyes, pigments, fillers, and the like. It may be advantageous in some instances to prepare a masterbatch of the block copolymer and any additional additives by mixing a high concentration of the additive package into the fiber-forming polymeric material or a similar polymer matrix and then to subsequently employ a portion of this masterbatch for blending with the fiber-forming polymer to obtain the desired concentration of the antistat and other additives in the finished composition or article.

The present antistat agents are useful in a wide variety of polymeric compositions and do not significantly detract from the physical properties of the final composition. In addition to fiber applications the present compositions are also useful in the production of molded or extruded objects such as rods, bars, tubes, films and the like. Fibers obtained by blending the present antistatic compositions with fiber-forming polymers in the previously defined ratios are useful for the preparation of fabrics, papers, ropes, strings, twines and felts among other applications. The end-use will dictate the particular polyester of polyamide to be employed as well as the composition and amount of the block copolymer antistatic agent and other additives.

We claim:

1. Poly(ether-ester-amide) compositions useful as durable antistatic agents comprising polyether blocks derived from a polyalkylene glycol of the formula

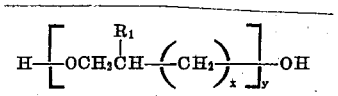

wherein R is hydrogen or an alkyl group containing from 1 to 4 carbon atoms, $x$ is an integer from 0 to about 8 and $y$ is a large whole number such that the molecular weight of the polyether block is between about 300 and 10,000 and polyamide blocks having molecular weights up to about 10,000 obtained by the reaction of a dimer acid obtained by the polymerization of an ethylenically unsaturated $C_{16}$-$C_{26}$ monocarboxylic acid with a diamine selected from the group consisting of alkyl diamines containing from 2 to 54 carbon atoms, aryl diamines, alicyclic diamines wherein the ring system contains 4 to 8 carbon atoms and may be substituted with one or more alkyl groups containing 1 to 8 carbon atoms and hetrocyclic diamines selected from the group consisting of piperazine and 2,5-dimethyl piperazine; said polyamide blocks corresponding to the formula

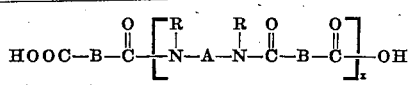

wherein R is hydrogen or an alkyl radical containing from 1 to 18 carbon atoms, B is a radical derived from the dimer acid and containing from 30 to about 50 carbon atoms, A is a radical derived from the diamine and $x$ is an integer from about 1 to about 20; and said polyether and polyamide blocks being linearly bonded with ester linkages and having a theoretical amide:ester linkage ratio between about 0.5:1 and 25:1 with the polyether blocks comprising about 10 to 75 percent by weight of the total block copolymer composition.

2. The poly(ether-ester-amide) composition of claim 1 wherein the amide:ester linkage ratio is between about 2:1 and 10:1 and the polyether block comprises from about 20 to about 60 weight percent of the total block copolymer composition.

3. The poly(ether-ester-amide) of claim 2 wherein the polyoxyalkylene glycol is a polyoxyethylene glycol having a molecular weight from about 1000 to about 5000.

4. The poly(ether-ester-amide) of claim 1 wherein the polyether block is derived from a polyoxyethylene glycol and the polyamide block is derived from piperazine or an aliphatic diamine containing 2 to 10 carbon atoms.

5. The poly(ether-ester-amide) of claim 4 wherein the theoretical amide:ester linkage ratio is between about 2:1 and 10:1, the polyether block comprises about 20 and about 60 percent by weight of the block copolymer composition, the polyoxyethylene glycol has a molecular weight from about 1,000 to 5,000 and the polyamide block has a molecular weight from about 1,000 to 6,000.

6. The poly(ether-ester-amide) of claim 5 wherein the polyamide block is derived from ethylene diamine and a $C_{36}$ dimer acid.

7. The poly(ether-ester-amide) of claim 5 wherein the polyamide block is derived from hexamethylene diamine and a $C_{36}$ dimer acid.

8. A polymer blend having improved resistance to static charge buildup comprising a polymer selected from the group consisting of polyesters, polyamides and polyolefins and from about 0.1 to 20 percent by weight of a poly(ether-ester-amide) comprising polyether blocks derived from a polyalkylene glycol of the formula

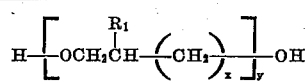

wherein $R_1$ is hydrogen or an alkyl group containing from 1 to 4 carbon atoms, $x$ is an integer from 0 to about 8 and $y$ is a large whole number such that the molecular weight of the polyether block is between 300 and 10,000 and polyamide blocks of molecular weight up to about 10,000 obtained by the reaction of a dimer acid obtained by the polymerization of an ethyleneically unsaturated $C_{16}$-$C_{26}$ monocarboxylic acid with a diamine selected from the group consisting of alkyl diamines containing from 2 to 54 carbon atoms, aryl diamines, alicyclic diamines wherein the ring system contains 4 to 8 carbon atoms and may be substituted with one or more alkyl groups containing 1 to 8 carbon atoms and heterocyclic diamines selected from the group consisting of piperazine and 2,5-dimethyl piperazine; said polyamide blocks corresponding to the formula

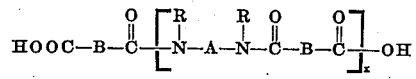

wherein R is hydrogen or an alkyl radical containing from 1 to 18 carbon atoms, B is a radical derived from dimer acid and containing from 30 to about 50 carbon atoms, A is a radical derived from the diamine and x is an integer from about 1 to about 20; and said polyether and polyamide blocks being linearly bonded with ester linkages and having a theoretical amide:ester ratio between 0.5:1 and 25:1 with the polyether blocks comprising about 10 to 75 percent by weight of the poly(ether-ester-amide) composition.

9. The polymer blend of claim 8 comprising a fiber-forming polyamide and about 1 to about 7 percent by weight of a poly(ether-ester-amide) having an amide:ester linkage ratio between about 2:1 and 10:1 with the polyether blocks comprising 20 to 60 percent by weight of the poly(ether-ester-amide).

10. The polymer blend of claim 9 wherein the poly(ether-ester-amide) is derived from a polyoxyethylene glycol of molecular weight 1,000 to about 5,000 and a polyamide of molecular weight from 1,000 to about 6,000 derived from a diamine selected from the group consisting of piperazine and aliphatic diamines containing from 2 to 10 carbon atoms.

11. The polymer blend of claim 10 wherein the polyamide is poly(caproamide) or poly(hexamethylenedipamide) and the poly(ether-ester-amide) is derived from polyoxyethylene glycol and a polyamide derived from ethylene diamine and a $C_{36}$ dimer acid.

12. The polymer blend of claim 10 wherein the polyamide is poly(caproamide) or poly(hexamethyleneadipamide) and the poly(ether-ester-amide) is derived from polyoxyethylene glycol and a polyamide derived from hexamethylene diamine and a $C_{36}$ dimer.

13. A process for preparing synthetic linear poly(ether-ester-amides) useful as durable antistatic agents which comprises reacting a polyoxyalkylene glycol having the formula

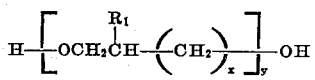

wherein $R_1$ is hydrogen or an alkyl group of 1 to 4 carbon atoms, $x$ is an integer from 0 to about 8 and $y$ is a large whole number so that the molecular weight is about 300 to 10,000 with a polyamide of the formula

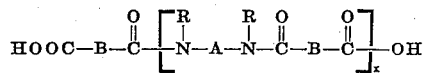

wherein R is hydrogen or an alkyl radical containing from 1 to 18 carbon atoms, B is a radical containing from 30 to about 50 carbon atoms, derived from a dimer acid obtained by the polymerization of an ethylenically unsaturated $C_{16}$–$C_{26}$ monocarboxylic acid A is a radical derived from a diamine selected from the group consisting of alkyl diamines containing from 2 to 54 carbon atoms, aryl diamines, alicyclic diamines wherein the ring system contains 4 to 8 carbon atoms and may be substituted with one or more alkyl groups containing 1 to 8 carbon atoms and heterocyclic diamines selected from the group consisting of piperazine and 2,5-dimethylpiperazine and $x$ is an integer from 1 to about 20, said polyamide having a molecular weight up to about 10,000, so that the poly(ether-ester-amide) contains 10 to about 75 percent by weight bound polyether and has a theoretical amide-ester linkage ratio between about 0.5:1 and 25:1.

14. The process of claim 13 wherein the polyoxyalkylene glycol is polyoxyethylene glycol having a molecular weight from about 1000 to about 5000 and the poly(ether-ester-amide) contains about 20 to about 60 weight percent polyether and has an amide-ester linkage ratio between about 2:1 and 10:1.

15. The process of claim 14 wherein the polyamide has a molecular weight from about 1000 to about 6000.

16. The process of claim 15 wherein the polyamide is prepared by heating the dimer acid and about 0.04 to 0.96 equivalent diamine per equivalent dimer acid until the reaction mixture has an acid value between about 15 and 30 with no appreciable amine value and then charging polyoxyethylene glycol so that the combined charge of diamine and polyoxyethylene glycol is about 0.8 to 1.2 equivalents per equivalent dimer acid and reacting at a temperature of about 230°C or higher under reduced pressure.

17. The process of claim 16 wherein 0.5 to 0.85 equivalent diamine and 0.15 to 0.5 equivalent polyoxyethylene glycol is employed per equivalent dimer acid.

18. The process of claim 17 wherein the polyamide block is derived from a $C_{36}$ dimer acid and piperazine or an aliphatic diamine containing about 2 to 10 carbon atoms.

19. The process of claim 15 wherein the polyamide block is prepared in the presence of a polyoxyethylene glycol by heating the dimer acid and about 0.04 to 0.96 equivalent diamine per equivalent dimer acid at a temperature of about 170°C until the reaction mixture has an acid value between about 15 and 30 with no appreciable amine value and then increasing the reaction temperature to about 240°C or higher under reduced pressure to complete the reaction.

20. The process of claim 19 wherein about 0.5 to 0.85 equivalent diamine and 0.15 to 0.5 equivalent polyoxyethylene glycol is employed per equivalent therefor dimer acid and the combined charge of diamine and polyoxyethylene glycol ranges from about 0.8 to about 1.2 equivalents per equivalent dibasic acid.

21. The process of claim 20 wherein the polyamide block is derived from a $C_{36}$ dimer acid and piperazine or an aliphatic diamine containing about 2 to 10 carbon atoms.

* * * * *

UNITED STATES PATENT OFFICE
CERTIFICATE OF CORRECTION

Patent No. 3,839,245          Dated October 1, 1974

Inventor(s) Irwin S. Schlossman; Thomas Zoun Lin Li; Jack B. Boylan

It is certified that error appears in the above-identified patent and that said Letters Patent are hereby corrected as shown below:

On the front page of the Patent, in the title, "DIMR" should read --- DIMER ---; and after the heading "Inventors:", "Zoum" should read --- Zoun ---.

Column 1, line 2, "DIMR" should read --- DIMER ---; Column 3, line 42 "face" should read --- fact ---; and Column 6, line 19, after "until" should be inserted --- there is ---.

Claim 16, lines 4 and 5, delete "an acid value between about 15 and 30 with"; Claim 19, line 6, delete "an acid value between about 15 and 30 with"; Claim 20, line 4, delete --- therefor ---; and Claim 20, line 6, "dibasic" should read --- dimer ---.

Signed and sealed this 7th day of January 1975.

(SEAL)
Attest:

McCOY M. GIBSON JR.
Attesting Officer

C. MARSHALL DANN
Commissioner of Patents